(12) United States Patent
Lewis et al.

(10) Patent No.: US 7,522,846 B1
(45) Date of Patent: Apr. 21, 2009

(54) TRANSMISSION POWER OPTIMIZATION APPARATUS AND METHOD

(75) Inventors: Stephen Lewis, Kanata (CA); Nigel Bragg, Weston Colville (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 776 days.

(21) Appl. No.: 10/744,359

(22) Filed: Dec. 23, 2003

(51) Int. Cl.
*H04B 10/04* (2006.01)

(52) U.S. Cl. .......................... 398/197; 398/195; 398/201

(58) Field of Classification Search ................ 398/26, 398/27, 193–195, 197, 201
See application file for complete search history.

(56) References Cited

U.S. PATENT DOCUMENTS

| | | | |
|---|---|---|---|
| 6,069,718 A * | 5/2000 | Khaleghi | 398/27 |
| 6,219,162 B1 * | 4/2001 | Barnard et al. | 398/9 |
| 6,934,479 B2 * | 8/2005 | Sakamoto et al. | 398/193 |
| 7,161,666 B2 * | 1/2007 | French et al. | 356/73.1 |
| 2002/0163683 A1 * | 11/2002 | Antoniades et al. | 359/110 |
| 2003/0152387 A1 * | 8/2003 | Duling et al. | 398/81 |

* cited by examiner

*Primary Examiner*—Dzung D Tran
(74) *Attorney, Agent, or Firm*—Anderson Gorecki & Manaras LLP

(57) ABSTRACT

A method and system is provided that is capable of controlling transmit power to achieve a desired OSNR at a receive endpoint. The system utilizes the fact that the aggregate power for a plurality of channels is controllable between a transmission point and a receive point in the network, and uses this characteristic to coarsely adjust transmission powers in the network to achieve desired OSNR results.

30 Claims, 5 Drawing Sheets

TRANSMISSION POWER OPTIMIZATION APPARATUS AND METHOD

FIELD OF THE INVENTION

This invention relates generally to the field of optical communication and more specifically to a method and apparatus for optimizing power transmission in an optical network.

BACKGROUND OF THE INVENTION

Fiber optic technology uses glass or plastic threads, called 'fibers' to transmit data. A fiber optic cable consists of a bundle of fibers, each of which is capable of transmitting messages modulated onto light waves. Dense Wavelength Division Multiplexing (DWDM) is an optical technology that works by combining and transmitting multiple signals simultaneously at different wavelengths (or channels) on the same fiber. In effect, one fiber is transformed into multiple virtual fibers.

DWDM networks strive to deliver each signal to a receiver with a satisfactory Optical Signal to Noise Ratio (OSNR) to achieve the desired system Bit Error Ratio (BER). Thus, the noise incurred by a signal as it traverses the network from transmitter should not exceed a predetermined value, and degradations to the signal, in terms of gains or losses, need to be controlled. However, as wavelengths pass through different components from a transmitter to a receiver, gain or loss of power (due to ripple) causes wavelengths to incur different amounts of noise, because the wavelength gains or loses power as it traverses amplifiers in its path. The amount of optical noise in each channel will differ depending upon the number of devices encountered by each signal in its path from transmitter to receiver, due to gain variations between channels. Some gain variations are systematic variations; for example the gain ripple of an amplifier is substantially a function of wavelength, and so accumulates along a chain of amplifiers from transmitter to endpoint. Other gain variations are random, for example, loss variation of individual components of demux/mux filter structures will be seen a loss variation between the different paths through them.

The problem of differing OSNR on different channels is further exacerbated in ring based architectures such as those generally used in metro applications. In ring architectures, individual wavelengths or bands of wavelengths travel different distances around the ring between their sources and destinations, resulting in different channels encountering different numbers of amplifiers and filters as they traverse their path.

When designing optical transport systems, a link budget for a given communication path is selected, wherein the link budget is the aggregate permissible OSNR (or BER) for each of the channels on a given fiber. Each component in the path introduces a gain or loss ripple to the wavelength that affects the available link budget for the transmission. In particular, amplifiers, which are often needed to boost signal power during transmission, also amplify the noise of a signal and introduce new noise, and therefore degrade the OSNR of a wavelength. Typical link budgets of some systems allow no more than three times the standard deviation from the original power for the wavelength, and as a result the worst case ripple through the system for a signal is three times the standard deviation from the original value. However, the addition of components can rapidly cause the link budge to be exceeded. Link budget impairments caused by wavelength dependent loss may be removed by re-generating the wavelength at periodic intervals in the transmission path using signal regenerators. Sufficient signal regenerator components are added in the communication path to ensure that the resultant gain or loss caused by ripple is within a predetermined deviation from the average. One problem with such an arrangement, however, is that signal regeneration is expensive, and thus it is desirable to minimize the number of signal regenerators in a transmission path. Thus, the need for amplifiers to provide adequate signal power causes the system to require wavelength power "balancing" to ensure that the signal goes end to end with acceptable BER (or OSNR). However, introduction of power balancing in such a solution is often not desirable in metro networks, because introducing overhead into a link solely to assist in power balancing, but otherwise providing no functional value, undesirably increases the cost of a cost-sensitive system. Thus it would be desirable to identify a low-cost method that would permit a system designer to attain a desired link budget in an optical communication network.

SUMMARY OF THE INVENTION

A method of designing an optical communication path for carrying a plurality of channels, where each channel is used for forwarding a signal, is described. The method includes the step of selecting a total transmission power for transmission of the plurality of channels, the total transmission power being a sum of initial transmission powers of all of the plurality of channels. The method includes the steps of transmitting each of the channels at an initial channel power, measuring, in the communication path, a change in power of at least one channel, and coarsely modifying the initial transmission channel power for at least one of the channels to reduce the change in the power of the at least one channel.

According to another aspect of the invention, an optical transport system includes a plurality of lasers for generating a corresponding plurality of signals, each of the signals operating at a different channel frequency, wherein each laser provides a signal having a wavelength and a transmit power, and wherein the transmit power of each wavelength is adjustable within a range of coarsely distributed transmit powers. The apparatus also includes a controller, coupled to each of the lasers, the controller for modifying the transmission power used by each laser in response to feedback associated with a received power of each of the plurality of signals at an endpoint by selecting an alternate transmission power for the laser from the range of coarsely distributed transmit powers.

According to a further aspect of the invention, an apparatus for designing an optical network wherein a plurality of signals are transmitted over a corresponding plurality of channels is described. The apparatus includes means for determining, at an endpoint in the optical network, a change in a characteristic of each of the plurality of signals from an initial transmission value; and means for coarsely modifying the transmission value of at least one of the plurality of signals to compensate for the change in characteristic (for example, change in power level or OSNR lost).

With such an arrangement, a low cost system is provided that is capable of controlling transmit power to achieve a desired OSNR at a receive endpoint. The system utilizes the fact that the aggregate power for a plurality of channels can be controlled in the network, and uses this characteristic to trade transmission power of signals having a high OSNR at a receive point for those signals having a low OSNR at the end point. With such an arrangement, the power deviations of received signals may be reduced by coarse adjustment of transmit signals. Because only coarse adjustment of the transmit power of the lasers is needed, the present invention may use a low cost direct modulated laser (DML), which can be calibrated to many power different power levels of coarser granularity. Such a system removes the need for electronic Variable Optical Attenuators (eVOAs) on each channel, for finer calibration of transmit signals, which are expensive. In systems where eVOAs and VOAs are used, the present invention allows eVOAs and VOAs to be moved to a location in the transmission path where they adjust aggregate power on a plurality of wavelengths, rather than individual wavelengths, making them more cost effective on networks with higher wavelength counts.

DETAILED DESCRIPTION

Referring now to FIG. 1, a number of links are shown in an optical network 10. In one embodiment of the invention, the optical network is a Dense Wavelength Division Multiplex (DWDM) system, which combines and transmits multiple signals simultaneously at different wavelengths (or channels) on the same fiber, effectively transforming one fiber into multiple virtual fibers. However, as will become more apparent below, the present invention may be used in other optical networks, such as WDM networks etc., and the present invention is not limited to any particular type of optical network.

Figure 1A:
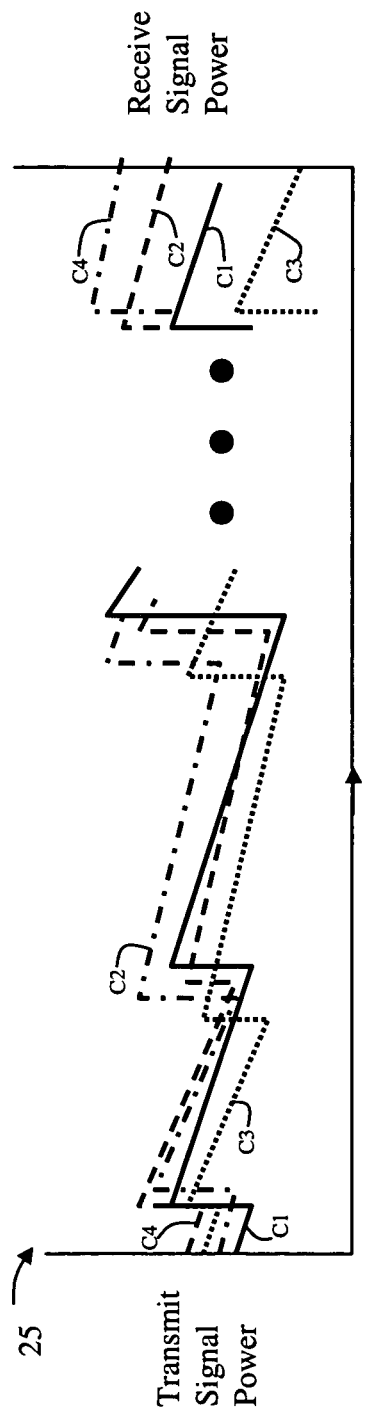
FIGS. 1A and 1B illustrate a power level graph and an optical transport system, respectfully, the graph for illustrating a drift, or ripple, in power levels of signals transmitted over the optical transport network.
Figure 1B:
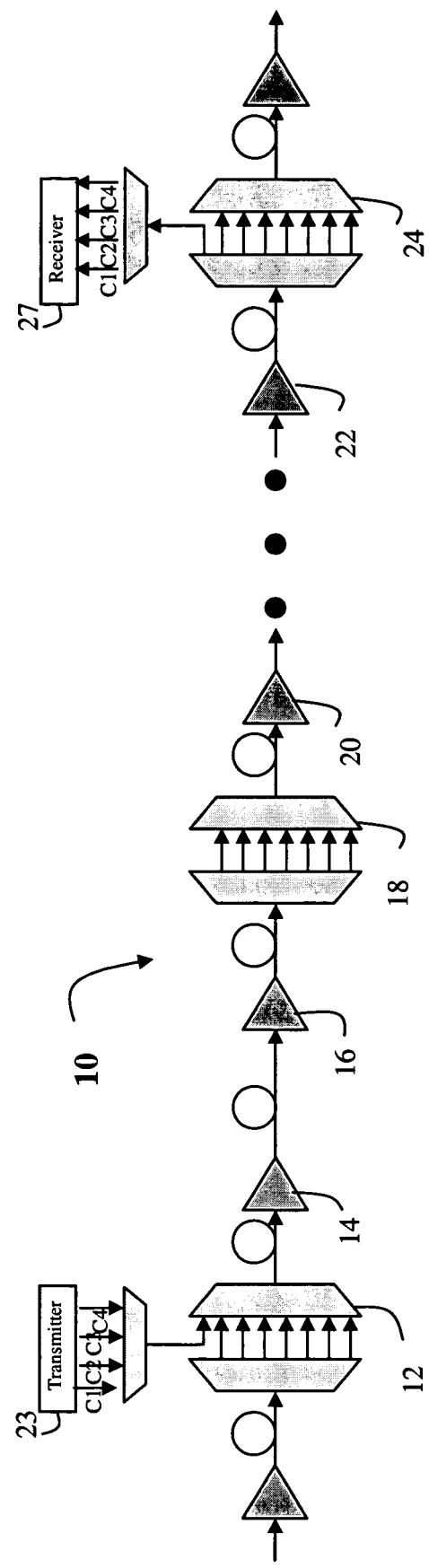

In general, the optical transport path includes a series of optical add drop multiplexers (OADMs) 12, 18 and 24 and other components such as amplifiers 14, 16, 20 and 22, or filters and the like. At various points in the optical path, the OADM is used to add new signals onto a given fiber. This feature is illustrated in FIG. 1B, where signals on channels C1, C2, C3 and C4 are transmitted for addition onto fiber at OADM 12. At a receiver, the signals can be retrieved from the OADM as shown at OADM 24. For the purposes of this application, the point in the network where a signal is added to the fiber will be referred to as the transmit point, and the point in the communication path at which the signals are retrieved from the fiber for use is referred to as the receive point or end point.

As discussed above, one problem with optical networks is that the different wavelengths experience different amounts of gain or loss ripple as they traverse the communication path from transmit point to receive point. This is in part due to the fact that each component will add different gains or losses to a signal, depending upon its transmission wavelength. FIG. 1A illustrates this characteristic of optical transmission. As shown in FIG. 1A, at the transmit point, the optical signal power is relatively even for each of the channels. However, as the signals propagate to the receive point, the signal power of each wavelength is modified according to the gain or loss attribute of each component for the wavelength, resulting in deviations in signal power at the end point. Thus, as shown in FIG. 1A, although channels C3 and C4 initially have similar transmit power, at the receive point the relative signal powers are widely divergent. The gain and loss ripple affects the Optical Signal to Noise Ratio (OSNR) and hence the Bit Error rate at the receiver.

The present invention compensates for the deviations in signal powers at the receive end point by coarsely preconditioning the signals transmitted at the transmit point in the optical network. For the purposes of the present invention, 'coarse' shall mean an incremental step size associated with a selectable power range of a Directly Modulated Laser (DML). In the embodiment described herein, the DML step size is assumed to be 1 dB, although it is appreciated that the present invention is not limited to any particular step size. Rather, the present invention takes advantage of the fact that the aggregate power of all channels is the same at the transmit point and receive point, thus, for each signal that has experienced a loss, at least one other signal has experienced a gain. Exchanging signal power between the two channels to precondition transmission reduces the deviations in signal power at the end point. In one embodiment, each transmitter includes a power controller that may be used to increase or decrease the output transmit power of the transmitter. In some embodiments, each transmitter includes taps that are used to measure the output power of the laser, where the output power taps are connected by a feedback path to the controller. In one embodiment, when a controller increases (or decreases) the transmit power of a laser for a transmitter, each rise in transmit power for one transmitter may be matched by a decrease in transmit power at one or more other transmitters. In this manner, coarse adjustments of transmit power (in the order of 1 dB step size, for example) may be used to obtain a desired OSNR result at a receiver.

Figure 2:
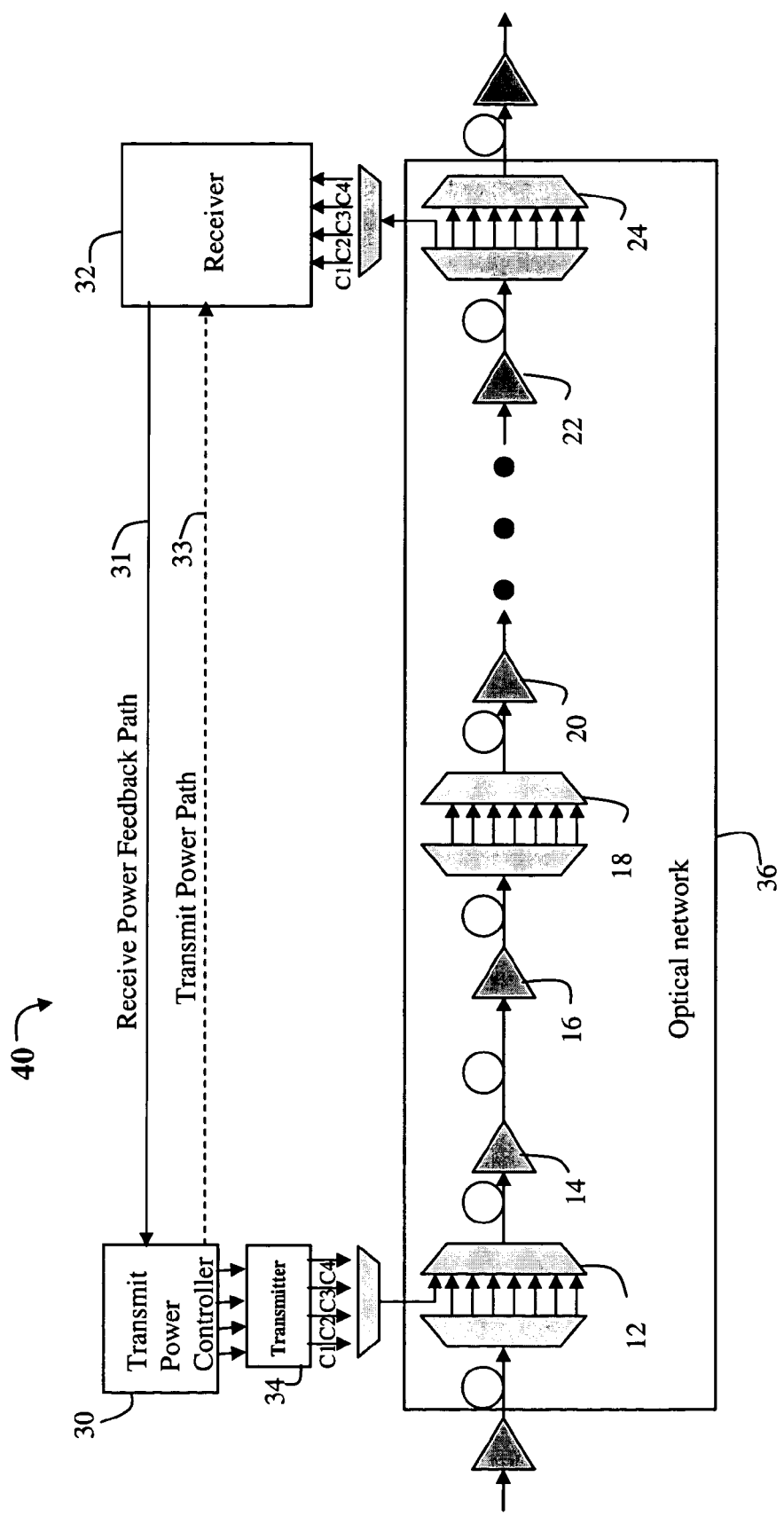
FIG. 2 illustrates an optical network design environment having components that may be used to optimize transmittal power for channels according to the present invention.

Referring now to FIG. 2, a block diagram illustrating exemplary components that may be included in an optical design system are shown. It should be understood that, although these components are shown as functional blocks, they may be implemented in hardware, software, or any combination thereof, and the present invention is not limited to any specific implementation of the functions to be described.

As in FIG. 1, the optical network 36 receives signals C1, C2, C3 and C4 via OADMs from transmitters such as transmitter 34. In alternate embodiments, each channel may be delivered by a separate transmitter. The signals propagate through the optical network to end point receiver 32. According to one aspect of the invention, feedback path 31 is provided to the transmit power controller 30. The feedback path 31 is used to forward information regarding a characteristic of the received signal of each of the channels to the transmit power controller.

The feedback path may be directly coupled to the receiver, such that a change in characteristic of the received signal is forwarded to the controller to enable the controller to alter transmit power at the transmitter. The characteristic could be a power level, OSNR, or BER of the received signal, depending upon the design of the optical system and the selected characteristic that is measured at an end point. The feedback loop could be a hardwired feedback, or alternatively could be a feedback loop that results from a user at a graphical interface evaluating the characteristics of the received signals and adjusting transmit power accordingly. In addition, information may be fed to the feedback path directly from a user interface, without actual measurement of any characteristic of the received signal. Such feedback information may be from a users knowledge of the design of a transmit path (i.e., if a channel is added later in the transmission path, the transmit power may be reduced for the signal). In addition, the user may use gain characteristics provided by component suppliers to manually present the transmit power for each channel. Alternate methods for indicating the change in signal power to the transmit power controller 30 are also envisioned, and the present invention is not limited to any particular mechanism for forwarding power deviation information back to the transmit power controller 30.

As shown in FIG. 2, the Transmit power controller 30 is coupled to an adjustable power control input of a laser, such as laser 42. Each laser has, as an input, a number of coarsely distributed transmit powers that are available transmit power for the laser. In one embodiment, a power tap (shown as dashed line 41) provides a feedback path to the controller 30 for each laser, thereby permitting the controller to monitor the output powers of the lasers. The controller 30 directly controls the output power levels for each transmitter for each channel by selecting the appropriate power at the power control input of the 42. As mentioned above, in one embodiment the transmit power controller 30, transmitter 34, laser 42, optical network 36 and receiver 32 together form a closed loop control mechanism that enables estimated measurement of OSNR (using measured power, BER or OSNR at the transmitter and receiver) for transmit power for each channel based on power at the receiver. Accordingly a mechanism is provided for fine tuning the OSNR for a set of channels using relatively coarse adjustments to the transmit power of the various channels. Of course it is understood that adjustments to the transmit power levels of the laser are most advantageous when the degradation in OSNR is more than the step size of the power adjustment on the transmitter, and thus adjustments need only be made when the OSNR exceeds the step size.

Figure 3:
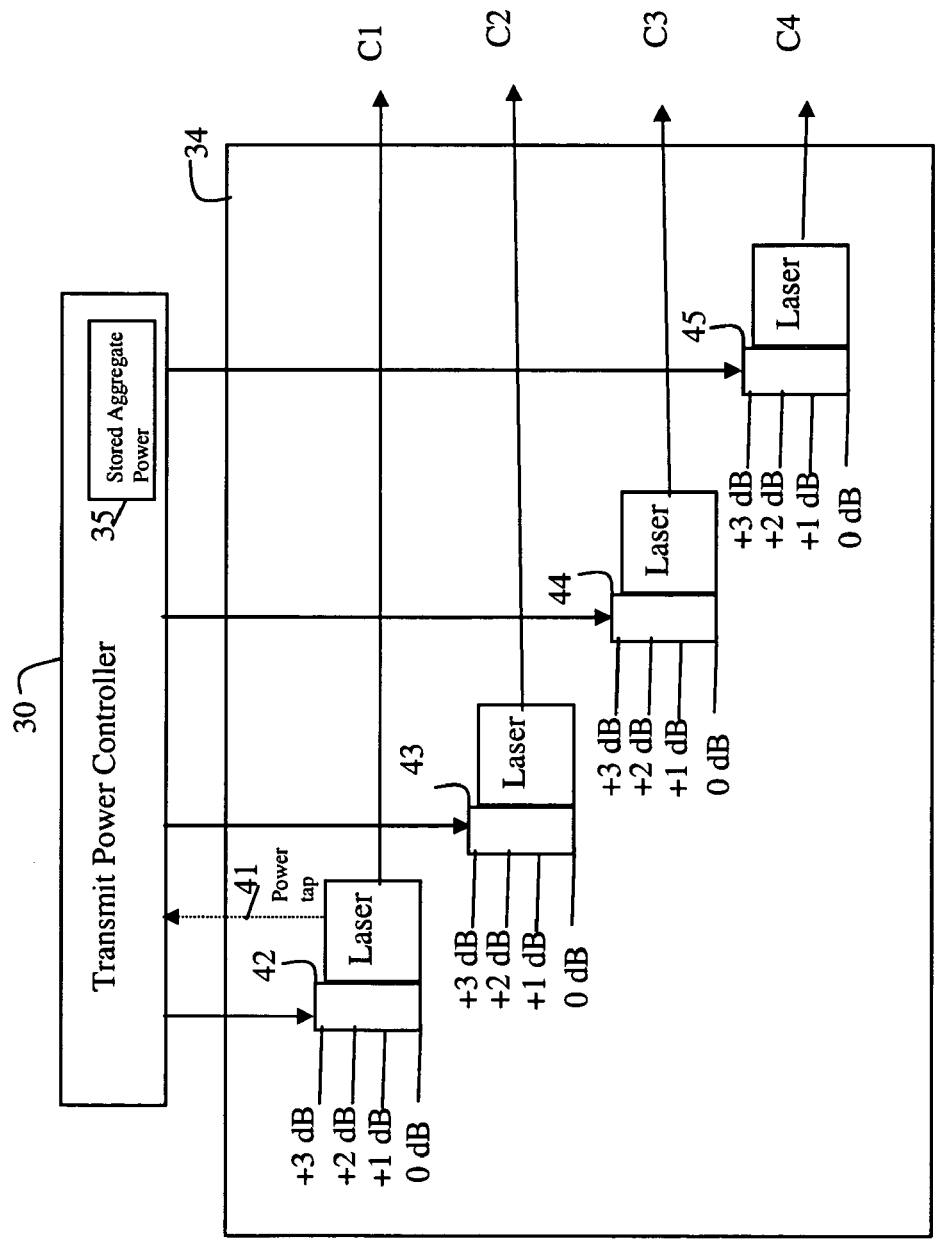
FIG. 3 is a more detailed diagram of the transmit power control functionality of the present invention.

For example, referring now to FIG. 3, a more detailed view of the transmitter logic and transmit power control interface is shown. In an exemplary embodiment, the transmitters are lasers such as DML lasers, which typically allow for coarse adjustable transmit power at the channel level. Alternate lasers capable of providing coarse adjustment of transmit power may readily be substituted herein for the DML laser. In the embodiment of FIG. 3, associated with each laser is a series of four different power adjustment values ranging from 0 to 3 dB. It should be noted that any number of taps having any different values may alternatively be provided, and the present invention is not limited to any particular range of power taps, but rather may be used in any system that permits modification of the transmit power by any amount. However, it is noted that the present invention advantageously uses coarse adjustments in the 3 dB range in 1 dB increments to achieve the desired OSNR results, thereby permitting use of a relatively inexpensive laser as a transmitter, and removing the need for other more expensive transmit components such as electrical Variable Optical Attenuators (eVOAs) and the like.

For an initial transmission, the transmit power controller 30 selects a common, midrange power for each of the lasers. Thus, for example in an embodiment with the laser having an adjustable range of 0 to 3 dBm, each laser would initially transmit the signal to the end point at the same power, for example 2 dBm. When the transmit power controller receives information regarding the deviation in output power at the end point in each channel, it can then adjust the power of each laser, for example by lowering the transmit power of a laser for a channel that experiences gain ripple to 1 dB while raising the transmit power of a laser for a channel that experiences loss ripple to 3 dB.

Figure 4:
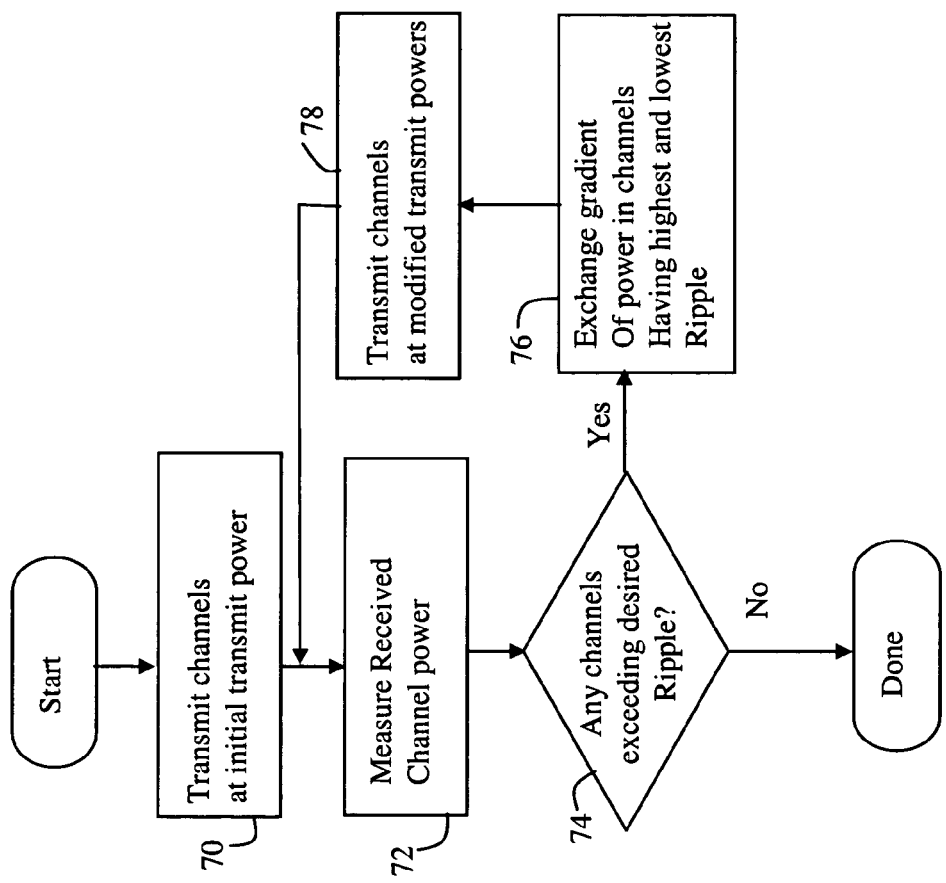
FIG. 4 is a flow diagram illustrating an exemplary process that may be used in designing an optical network having optimized transmission power according to the present invention.

FIG. 4 is a flow diagram illustrating the process that may be used to optimize transmit power for the purpose of improving the OSNR characteristic for a set of channels. At step 70, as just described in FIG. 3, the transmit power controller transmits signals to the receive end point at an initial power. At step 72, when the signals are received at the end point, the receiver measures the signal power of the received signals, and communicates the received signal information back to the transmit power controller. If the transmit power controller determines at step 74 that the OSNR of the signals is lower than the desired OSNR threshold, then at step 76 the transmit control power reduces transmit power for the signal having the highest gain, and increases transmit power for the signal experiencing the greatest loss. The signals are again transmitted to the end point, to determine whether the change satisfied the OSNR requirements for the path, and the process of swapping transmit powers between channels experiencing gain and those experiencing losses continues until the desired OSNR is met, or it is determined that the desired OSNR cannot be met.

The above described iterative process discusses swapping values between only two channels for each pass. Alternatively, the process may modify transmit powers for multiple channels for each pass, and thus the present invention is not limited merely to the process described in FIG. 4. In addition, although it has been described that there is a straight swap between one channel and another, it may be that losses in multiple channels are offset by a large gain in one channel. Thus, the present invention is not limited to any particular trade of transmit powers between channels, in any particular order, but rather encompasses a system wherein ripple gains and losses are equalized by preconditioning transmit signals in a manner that ensures that a controlled aggregate power is maintained.

Figure 5A:
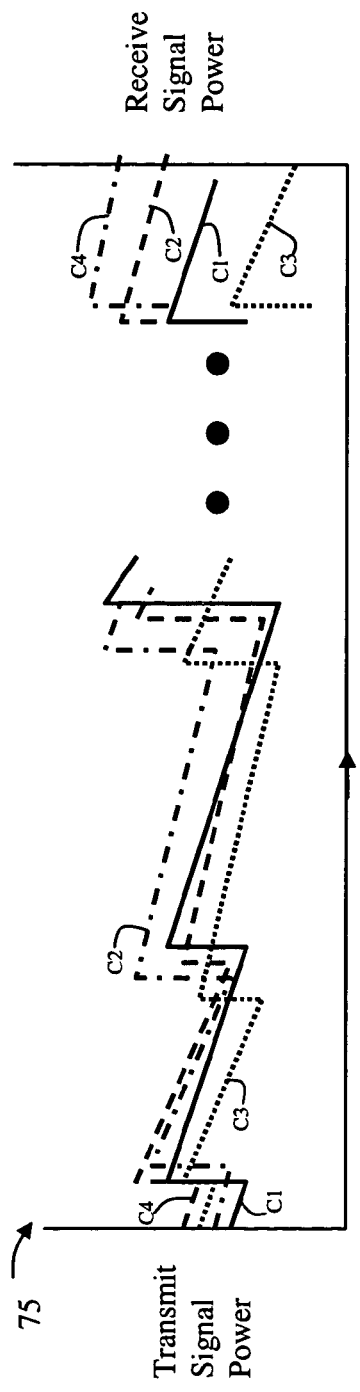
FIGS. 5A and 5B are power graphs used for illustrating how the process of the present invention may be applied to optimize transmit power while decreasing OSNR.
Figure 5B:
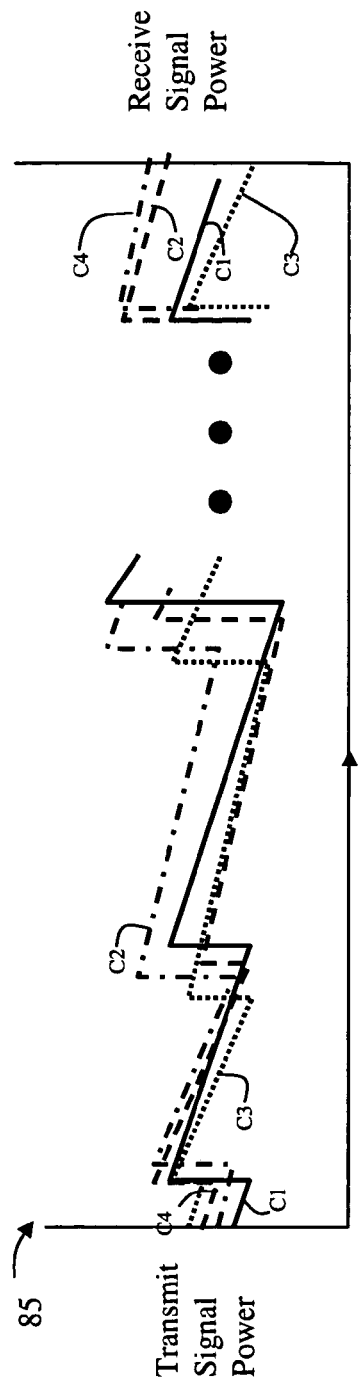

Referring now to FIGS. 5A and 5B, a set of graphs is provided for illustrating the OSNR equalization effect achieved by appropriate assignment of portions of an aggregate transmit power to various channels. FIG. 5A is similar to FIG. 1A, and illustrates the ripple gains and losses realized by the different wavelengths that traverse the optical network. In particular FIG. 5A illustrates a large deviation in output power between channels C3 and C4. Application of the present invention is shown in FIG. 5B, where it is shown that, at the transmit point in the network, the initial transmit power of channel C4 has been decreased, while the initial transmit power of channel C3 has been increased, resulting in an improved signal power deviation at the receive end point in the network.

Accordingly, a system and method for designing an optical network has been shown and described. The system allows a desired OSNR/BER criteria to be met though by alternation of transmit powers for the individual channels. A feedback path to a transmit controller uses knowledge regarding characteristics of the received signals in determining the amount to adjust the transmit power. The knowledge may be gained by actual measurement of characteristics of the received signal (including power levels, BER, or OSNR), or through knowledge gained regarding design of the system. The implementation of the present invention may take many forms. For example, a graphical user interface may be coupled to transmit and receive end points of the network, giving a user visibility to the gain and ripple effects and permitting manual manipulation of transmit power and testing. Alternatively, the process may be automated through a computer software program executing on a computer attached in the network. In addition, although the above description has described measurement of signal power deviations at the end point of a communication path, the feedback path may be initiated from any point in the path where there is visibility of channel power.

Various modifications to the above embodiments are envisioned, and therefore are not seen as limiting the present invention. Although various components were shown as functional blocks, it is understood that these functions may be implemented in hardware, software, or any combination thereof, and no particular delineation of functionality is part of the invention. Alternative embodiments of the invention may be implemented in any computer readable program language, whether it be conventional or object oriented, or alternatively using discrete components, integrated circuitry, programmable logic, microprocessors or any combination thereof. A computer program product implementation may include a series of computer instructions fixed either on a tangible medium, such as a computer readable media (e.g. diskette, CD-ROM, ROM or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g. microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in a memory device, such as semiconductor, magnetic, optical or other memory devices, and may be transmitted using any communications technology, such as optical, infrared, microwave, or other transmissions technologies.

Having described various embodiments of the invention, it is understood that the present invention should not be limited to any specific disclosure herein, but rather is embodied in the spirit and scope of the claims attached hereto.

The invention claimed is:

1. A method of designing an optical communication path for carrying a plurality of channels, where each channel is used for forwarding a signal, includes the steps of:
    transmitting signals on each of the channels from a transmit point to an end point using a Directly Modulated Laser (DML) having a selectable power range comprising a plurality of coarse incremental steps associated with a plurality of output power levels, the transmitted signals having an aggregate power level; and
    decreasing deviation of output signal characteristics between a first channel transmitted at a first initial power level and a second channel transmitted at a second initial power level by coarsely modifying the first and second initial transmit power levels by equal but opposite coarse while maintaining the aggregate power level of the transmitted signals.

2. The method of claim 1, wherein the characteristic of the transmitted signal is a measured change in power level of the transmitted signal at the end point.

3. The method according to claim 2, further including the steps of:
    following the step of modifying, transmitting each of the signals to the endpoint; and
    repeating the steps of transmitting, measuring and modifying until it is determined that the signals in the channels have desirable characteristics.

4. The method of claim 1, wherein the characteristic of the transmitted signal is a measured Bit Error Ratio (BER) of the transmitted signal at the end point.

5. The method of claim 1, wherein the characteristic of the transmitted signal is an estimated change in power level of the transmitted signal based on specifications of the components in a path between the transmit point and the end point.

6. The method of claim 1, wherein the characteristic of the transmitted signal is a measured Signal to Noise Ratio (SNR) of the transmitted signal at the end point.

7. The method of claim 1, further comprising the step of performing any fine tuning of a transmit signal using a Variable Optical Attenuator (VOA) prior to the step of coarsely adjusting.

8. The method of claim 1, wherein the step of coarsely modifying the initial transmit power of the at least one channel to compensate for characteristics of the transmitted signal at the end point includes the step of measuring the characteristic of the channel at the end point.

9. The method according to claim 8, wherein the step of measuring includes the steps of:
    measuring each of the plurality of channels at the endpoint;
    selecting a pair of channels, with a first channel of the pair having a decreased power at the end point and a second channel of the pair having an increased power at the endpoint;
    modifying a first transmit power of the first channel by increasing the first transmit power by a determined amount; and
    modifying a second transmit power of the second channel by decreasing the second transmit power by the determined amount.

10. The method of claim 1, wherein the step of coarsely modifying the initial transmit power of the at least one channel to compensate for characteristics of the transmitted signal at the end point includes the steps of estimating the characteristic of the channel at the end point in response to design specifications of the system.

11. The method according to claim 1, wherein the step of coarsely modifying the initial transmit power selects a first transmit power from a predefined set of coarsely distributed alternative transmit powers for transmit the at least one channel.

12. The method according to claim 1, wherein the step of modifying the initial channel power selects a transmit power from a predefined set of coarsely distributed alternative transmit powers for transmit of another one of the plurality of channels.

13. An optical network comprising:
    a transmitter comprising a plurality of Directly Modulated Lasers (DML which provide transmitted signals having transmit powers selectable by coarse increments, the transmitter for generating a corresponding plurality of signals, each of the signals operating at a different channel frequency, wherein each laser provides a signal having a wavelength and a transmit power in response to a selected increment of the DML to an end point;
    a controller, coupled to each of the lasers, the controller for modifying the transmission power used by first and second DMLs by equal but opposite coarse increments to decrease deviation of an output signal characteristic between a first channel transmitted by the first DML and a second channel transmitted the second DML in response to feedback, wherein aggregate power at the end point is unchanged by modifying the transmission power of the first and second DMLs by equal but opposite coarse increments.

14. The optical network of claim 13, wherein the characteristic of the transmitted signal is a measured change in power level of the transmitted signal at the end point.

15. The optical network of claim 13, wherein the characteristic of the transmitted signal is a measured Bit Error Ratio (BER) of the transmitted signal at the end point.

16. The optical network of claim 13, wherein the characteristic of the transmitted signal is an estimated change in power level of the transmitted signal based on specifications of the components in a path between the transmit point and the end point.

17. The optical network of claim 13, wherein the characteristic of the transmitted signal is a measured Signal to Noise Ratio (SNR) of the signal at the end point.

18. The optical network of claim 13, further comprising at least one Variable Optical Attenuator (VOA) coupled prior to the controller.

19. The optical network of claim 13, including means for measuring the characteristic of the channel at the end point.

20. The optical network of claim 13, wherein including means for estimating the characteristic of the channel at the end point in response to design specifications of the system.

21. An apparatus for designing an optical network wherein a plurality of signals are transmitted over a corresponding plurality of channels including:
  means for determining, at an endpoint in the optical network, a change in a characteristic of each of the plurality of signals,
  means for determining an aggregate power of the plurality of signals, and
  means for coarsely modifying the transmission power of at least two of the plurality of signals by equal but opposite coarse increments to reduce deviation in the characteristic between ones of the plurality of signals at the endpoint without changing the aggregate power of the plurality of signals.

22. The apparatus of claim 21, wherein the means for determining and the means for modifying comprise a graphical user interface.

23. The apparatus of claim 21 wherein the plurality of signals are transmitted with a total initial aggregate transmission power, and transmission powers of at least two of the plurality of signals are modified such that the total modified aggregate transmission power of the plurality of signals is equal to the total initial aggregate transmission power.

24. The apparatus of claim 21, wherein the characteristic of the transmitted signal is a measured change in power level of the transmitted signal at the end point.

25. The apparatus of claim 21, wherein the characteristic of the transmitted signal is a measured Bit Error Ratio (BER) of the transmitted signal at the end point.

26. The apparatus of claim 21, wherein the characteristic of the transmitted signal is a measured Signal to Noise Ratio (SNR) at the end point.

27. The apparatus of claim 21, wherein the characteristic of the transmitted signal is an estimated change in power level of the transmitted signal based on specifications of the components in a path between the transmit point and the end point.

28. The apparatus of claim 21, further comprising at least one Variable Optical Attenuator (VOA) coupled prior to the controller.

29. The apparatus of claim 21, including means for measuring the characteristic of the channel at the end point.

30. The apparatus of claim 21, wherein including means for estimating the characteristic of the channel at the end point in response to design specifications of the system.

* * * * *